US012027101B2

(12) United States Patent
Kim

(10) Patent No.: US 12,027,101 B2
(45) Date of Patent: Jul. 2, 2024

(54) DISPLAY DEVICE AND METHOD OF DRIVING THE SAME

(71) Applicant: Samsung Display Co., LTD., Yongin-si (KR)

(72) Inventor: Young-Il Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/138,360

(22) Filed: Apr. 24, 2023

(65) Prior Publication Data

US 2024/0054939 A1 Feb. 15, 2024

(30) Foreign Application Priority Data

Aug. 12, 2022 (KR) .......................... 10-2022-0101431

(51) Int. Cl.
*G09G 3/20* (2006.01)
*G06F 3/01* (2006.01)

(52) U.S. Cl.
CPC ........... *G09G 3/2096* (2013.01); *G06F 3/013* (2013.01); *G09G 2310/08* (2013.01); *G09G 2320/0247* (2013.01); *G09G 2330/021* (2013.01); *G09G 2354/00* (2013.01)

(58) Field of Classification Search
CPC ......... G09G 3/2096; G09G 2320/0247; G09G 2310/08; G09G 2330/021; G09G 2354/00; G06F 3/013
See application file for complete search history.

(56) References Cited

U.S. PATENT DOCUMENTS

| 2008/0111833 | A1* | 5/2008 | Thorn | G06F 1/3231 |
| | | | | 345/690 |
| 2015/0116203 | A1* | 4/2015 | Narita | G06T 5/003 |
| | | | | 345/156 |
| 2017/0309216 | A1* | 10/2017 | Jiao | G09G 3/2007 |
| 2020/0074941 | A1* | 3/2020 | Takahashi | G09G 3/36 |
| 2021/0097957 | A1* | 4/2021 | Tsuchihashi | G09G 5/10 |
| 2021/0217378 | A1* | 7/2021 | Yokokawa | G02B 27/0172 |
| 2021/0341998 | A1* | 11/2021 | Sun | G06T 19/006 |
| 2022/0147142 | A1* | 5/2022 | Bui | G09G 3/3406 |
| 2022/0197377 | A1* | 6/2022 | Kim | G09G 3/2092 |
| 2023/0025457 | A1* | 1/2023 | Lin | G06V 40/18 |
| 2023/0069348 | A1* | 3/2023 | Park | G02B 27/0101 |

(Continued)

FOREIGN PATENT DOCUMENTS

| KR | 1020110096372 A | 8/2011 |
| KR | 101242531 B1 | 3/2013 |
| KR | 1020160109443 A | 9/2016 |

(Continued)

*Primary Examiner* — Doon Y Chow
(74) *Attorney, Agent, or Firm* — CANTOR COLBURN LLP

(57) ABSTRACT

A display device includes: a display panel including pixels; an eye tracker configured to determine a gaze point on the display panel by tracking a gaze of a user; and a timing controller configured to determine a luminance variable region of the display panel based on the gaze point, and to decrease a luminance of the luminance variable region. The timing controller is configured to decrease the luminance of a point in the luminance variable region more as the point in the luminance variable region is farther from the gaze point.

18 Claims, 12 Drawing Sheets

(56) References Cited

U.S. PATENT DOCUMENTS

2023/0131669 A1* 4/2023 Li .......................... G09G 5/10
                                                    345/102
2023/0200639 A1* 6/2023 Yehezkel ................ A61H 1/00
                                                    351/222

FOREIGN PATENT DOCUMENTS

KR          101891786 B1    8/2018
KR          102098277 B1    4/2020

* cited by examiner

DISPLAY DEVICE AND METHOD OF DRIVING THE SAME

This application claims priority to Korean Patent Application No. 10-2022-0101431, filed on Aug. 12, 2022, and all the benefits accruing therefrom under 35 U.S.C. § 119, the content of which in its entirety is herein incorporated by reference.

BACKGROUND

1. Field

Embodiments of the present invention relate to a display device and a method of driving the display device. More particularly, embodiments of the present invention relate to a display device for adjusting luminance using an eye tracking and a method of driving the display device.

2. Description of the Related Art

Generally, a display device may include a display panel, a timing controller, gate driver, and a data driver. The display panel may include a plurality of gate lines, a plurality of data lines, and a plurality of pixels electrically connected to the gate lines and the data lines. The gate driver may provide gate signals to the gate lines. The data driver may provide data voltages to the data lines. The timing controller may control the gate driver and the data driver.

Vision, the most sensitive and quick response among a body's five senses, may be the most important information acquisition route for humans. In this regard, an eye tracking technology that detects where a gaze of a user is directed has been developed. The eye tracking technology is actively being combined with VR, AR, and various IT devices, and it may be used in various fields such as next-generation games, driver gaze information analysis, financial payment based on iris information recognition, and viewing age limit function.

SUMMARY

Embodiments of the present invention provide a display device that adjusts a luminance through an eye tracking. Embodiments of the present invention also provide a method of driving the display device.

According to embodiments of the present invention, a display device includes: a display panel including pixels; an eye tracker configured to determine a gaze point on the display panel by tracking a gaze of a user; and a timing controller configured to determine a luminance variable region of the display panel based on the gaze point, and decrease a luminance of the luminance variable region. The timing controller is configured to decrease the luminance of a point in the luminance variable region more as the point in the luminance variable region is farther from the gaze point.

In an embodiment, the timing controller may be configured to determine a region in which a distance from the gaze point is greater than or equal to a first reference distance as the luminance variable region.

In an embodiment, the timing controller may be configured to determine a region in which a distance from the gaze point is greater than or equal to a first reference distance and smaller than a second reference distance greater than the first reference distance as the luminance variable region.

In an embodiment, the timing controller may be configured to gradually restore the luminance of the point in the luminance variable region when the luminance is decreased by a previous change of the gaze point and the gaze point is restored.

In an embodiment, the display device may further include an illuminance sensor configured to sense an environmental illuminance, and the timing controller may be configured to decrease the luminance of the luminance variable region less as the sensed illuminance is higher.

In an embodiment, the timing controller may be configured to decrease the luminance of the luminance variable region more as a target luminance ratio set by the user is lower.

According to embodiments of the present invention, a display device includes: a display panel including pixels; an eye tracker configured to determine a gaze point on the display panel by tracking a gaze of a user; and a timing controller configured to determine a luminance variable region of the display panel based on the gaze point, and to increase a luminance of the luminance variable region. The timing controller is configured to increase the luminance of a point in the luminance variable region more as the point in the luminance variable region is closer to the gaze point.

In an embodiment, the timing controller may be configured to determine a region in which a distance from the gaze point is greater than or equal to a first reference distance as the luminance variable region.

In an embodiment, the timing controller is configured to determine a region in which a distance from the gaze point is greater than or equal to a first reference distance and smaller than a second reference distance greater than the first reference distance as the luminance variable region.

In an embodiment, the timing controller may be configured to gradually restore the luminance of the point in the luminance variable region when the luminance is increased by a previous change of the gaze point and the gaze point is restored.

In an embodiment, the display device may further include an illuminance sensor configured to sense an environmental illuminance, and the timing controller may be configured to increase the luminance of the luminance variable region more as the sensed illuminance is higher.

In an embodiment, the timing controller may be configured to increase the luminance of the luminance variable region more as a target luminance ratio set by the user is higher.

In an embodiment, the timing controller may be configured to determine a luminance fixed region of the display panel based on the gaze point and to increase a luminance of the luminance fixed region.

In an embodiment, the luminance fixed region may be closer to the gaze point than the luminance variable region.

In an embodiment, a luminance ratio of the luminance fixed region may be equal to a maximum luminance ratio of the luminance variable region.

According to embodiments of the present invention, a method of driving a display device includes: determining a gaze point on a display panel of the display device by tracking a gaze of a user; determining a luminance variable region of the display panel based on the gaze point, and decreasing a luminance of the luminance variable region. wherein the decreasing of the luminance includes decreasing the luminance of a point in the luminance variable region more as the point in the luminance variable region is farther from the gaze point.

In an embodiment, the luminance variable region may be a region in which a distance from the gaze point is greater than or equal to a first reference distance.

In an embodiment, the luminance variable region may be a region in which a distance from the gaze point is greater than or equal to a first reference distance and smaller than a second reference distance greater than the first reference distance.

In an embodiment, the method may further include gradually restoring the luminance of the point in the luminance variable region when the luminance is decreased by a previous change of the gaze point and the gaze point is restored.

In an embodiment, the method may further include sensing an environmental illuminance, and decreasing the luminance of the luminance variable region less as the sensed illuminance is higher.

Therefore, the display device may effectively reduce power consumption and improve visibility by determining a luminance variable region of a display panel based on a gaze point, decreasing a luminance of the luminance variable region, and further decreasing the luminance of the luminance variable region as a distance between the luminance variable region and the gaze point increases.

In addition, the display device may effectively improve visibility by determining a luminance variable region of the display panel based on the gaze point, increasing a luminance of the luminance variable region, and further increasing the luminance of the luminance variable region as a distance between the luminance variable region and the gaze point decreases.

However, the effects of the present invention are not limited to the above-described effects, and may be variously expanded without departing from the spirit and scope of the present invention.

DETAILED DESCRIPTION

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Hereinafter, the present invention will be explained in detail with reference to the accompanying drawings.

Figure 1:
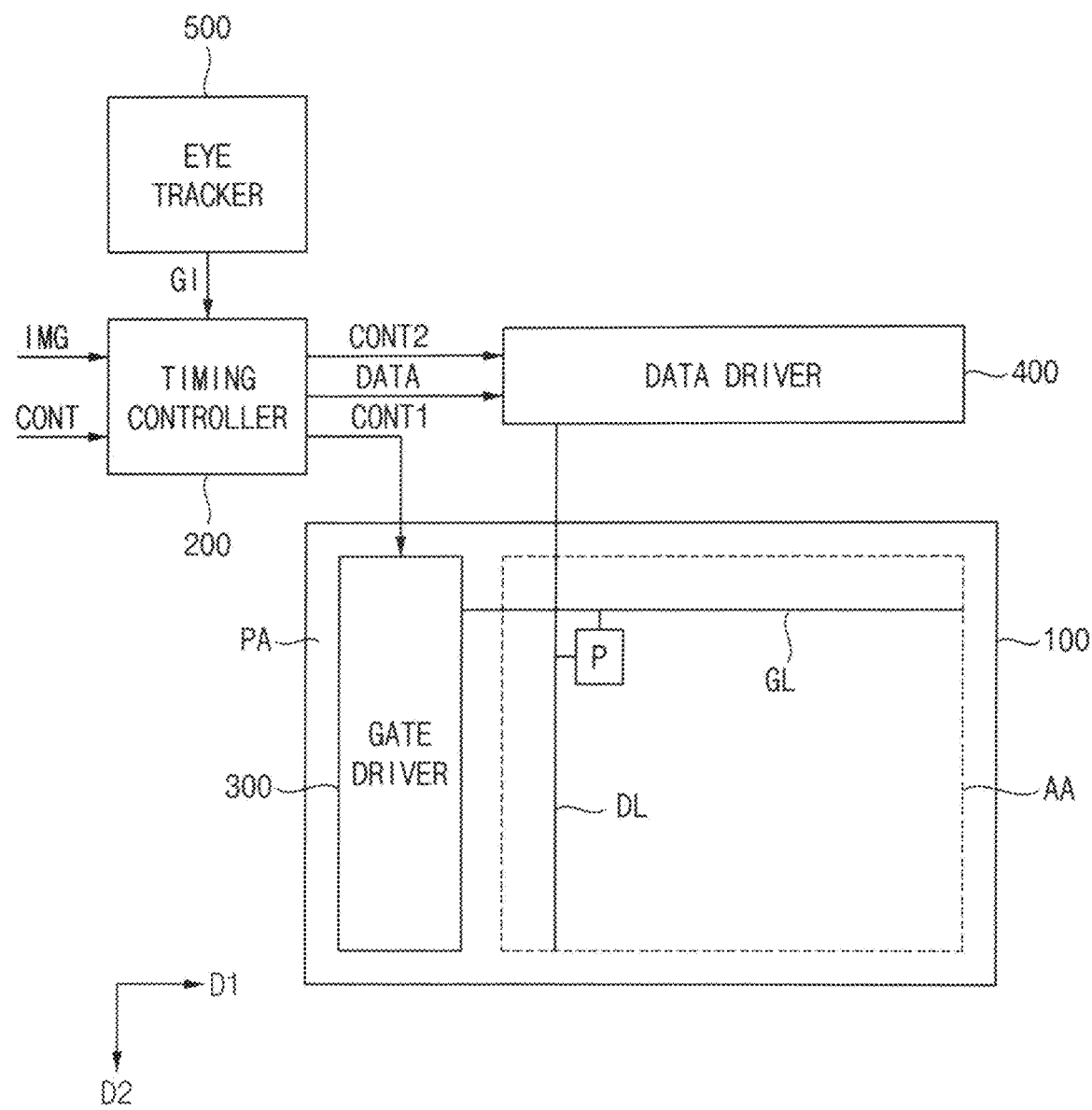
FIG. 1 is a block diagram illustrating a display device according to embodiments of the present invention.

FIG. 1 is a block diagram illustrating a display device according to embodiments of the present invention.

Referring to FIG. 1, the display device may include a display panel 100, a timing controller 200, a gate driver 300, a data driver 400, and an eye tracker 500. In an embodiment, the timing controller 200 and the data driver 400 may be integrated into one chip.

The display panel 100 has a display region AA on which an image is displayed and a peripheral region PA adjacent to the display region AA. In an embodiment, the gate driver 300 may be mounted on the peripheral region PA of the display panel 100.

The display panel 100 may include a plurality of gate lines GL, a plurality of data lines DL, and a plurality of pixels P electrically connected to the data lines DL and the gate lines GL. The gate lines GL may extend in a first direction D1 and the data lines DL may extend in a second direction D2 crossing the first direction D1.

The timing controller 200 may receive input image data IMG and an input control signal CONT from a host processor (e.g., a graphic processing unit; GPU). For example, the input image data IMG may include red image data, green image data and blue image data. In an embodiment, the input image data IMG may further include white image data. For another example, the input image data IMG may include magenta image data, yellow image data, and cyan image data. The input control signal CONT may include a master clock signal and a data enable signal. The input control signal CONT may further include a vertical synchronizing signal and a horizontal synchronizing signal.

The timing controller 200 may generate a first control signal CONT1, a second control signal CONT2, and data signal DATA based on the input image data IMG and the input control signal CONT.

The timing controller 200 may generate the first control signal CONT1 for controlling operation of the gate driver 300 based on the input control signal CONT and output the first control signal CONT1 to the gate driver 300. The first control signal CONT1 may include a vertical start signal and a gate clock signal.

The timing controller 200 may generate the second control signal CONT2 for controlling operation of the data driver 400 based on the input control signal CONT and output the second control signal CONT2 to the data driver 400. The second control signal CONT2 may include a horizontal start signal and a load signal.

The timing controller 200 may receive the input image data IMG and the input control signal CONT, and generate the data signal DATA. The timing controller 200 may output the data signal DATA to the data driver 400.

The gate driver 300 may generate gate signals for driving the gate lines GL in response to the first control signal CONT1 input from the timing controller 200. The gate driver 300 may output the gate signals to the gate lines GL. For example, the gate driver 300 may sequentially output the gate signals to the gate lines GL.

The data driver 400 may receive the second control signal CONT2 and the data signal DATA from the timing controller 200. The data driver 400 may convert the data signal DATA into data voltages having an analog type. The data driver 400 may output the data voltages to the data lines DL.

Figure 2:
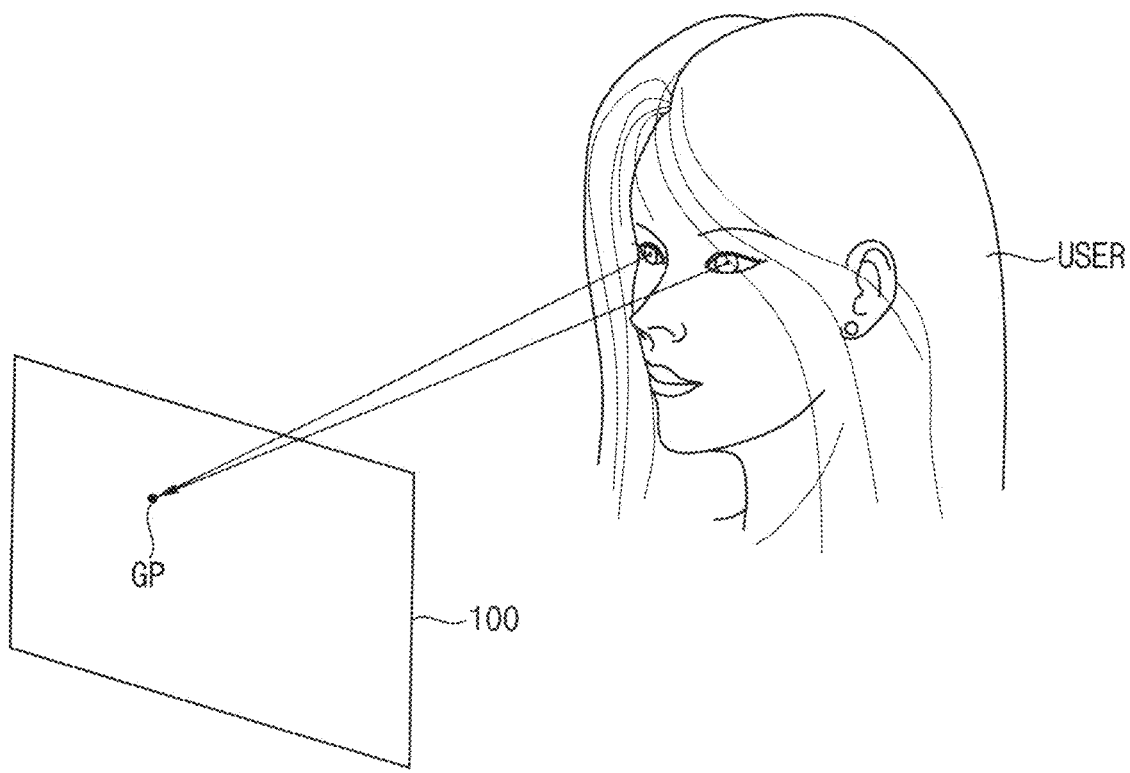
FIG. 2 is a diagram for explaining a gaze point.

FIG. 2 is a diagram for explaining a gaze point.

FIGS. 1 and 2, the eye tracker 500 may determine a gaze point GP on the display panel 100 by tracking a gaze of a user. The gaze point GP may be a point at which the user currently gazes. The eye tracker 500 may output an information GI on the gaze point GP to the timing controller 200.

For example, the eye tracker 500 may include a camera, an illuminator, and an image processing algorithm. The illuminator may generate a near-infrared pattern by projecting the near-infrared light onto the user's eye. The camera may take an image of the user's eye and the near-infrared pattern. The eye tracker 500 may use the image processing algorithm therein to find a detailed information in the user's eye and reflection pattern (i.e., a photographed near-infrared pattern). The eye tracker 500 may determine the gaze point GP using the detailed information and a three-dimensional (3D) eye model algorithm.

Figure 3:
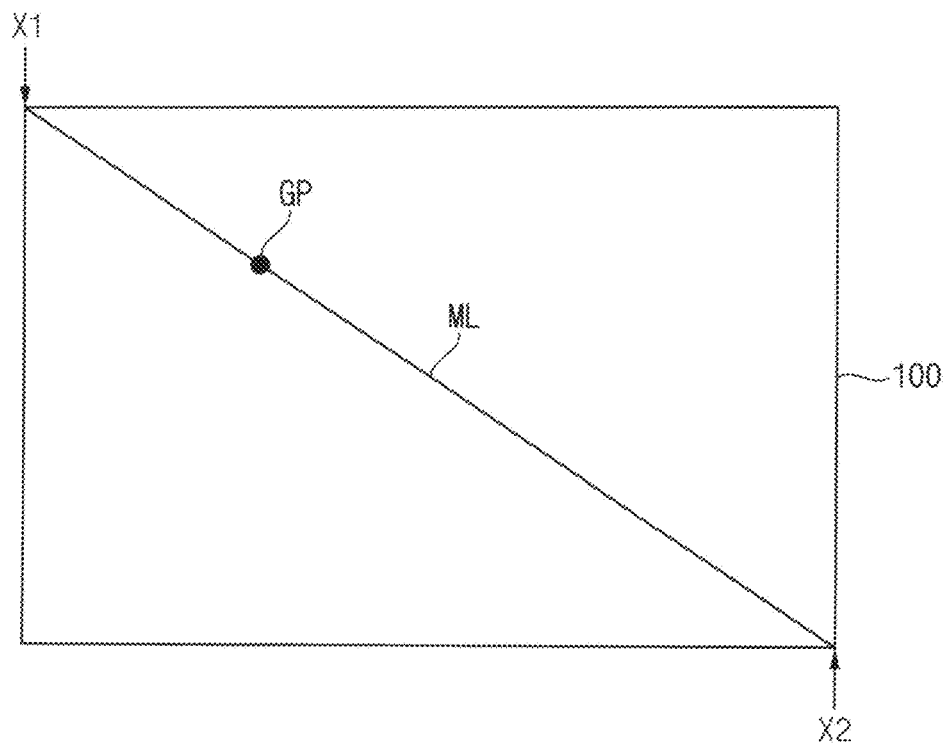
FIG. 3 is a diagram illustrating an example of a gaze point on the display device of FIG. 1.
Figure 4:
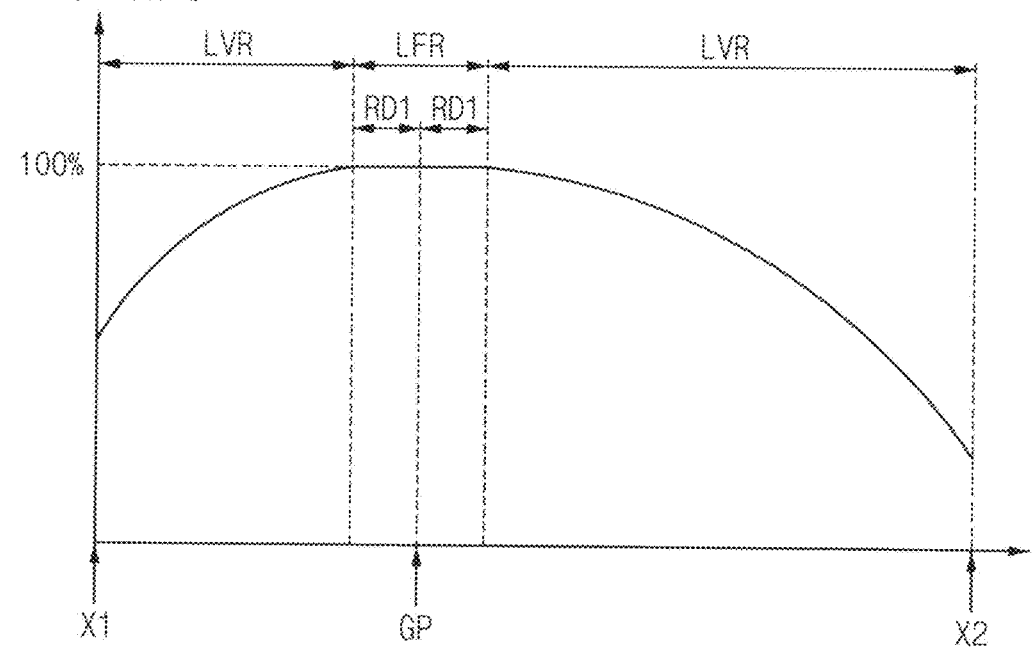
FIG. 4 is a graph illustrating an example in which the display device of FIG. 1 adjusts a luminance in a measurement line.

FIG. 3 is a diagram illustrating an example of the gaze point GP on the display device of FIG. 1, and FIG. 4 is a graph illustrating an example in which the display device of FIG. 1 adjusts a luminance in a measurement line ML. FIG. 4 shows a luminance ratio measured along the measurement line ML of FIG. 3 for convenience of explanation.

FIGS. 1, 3, and 4, the timing controller 200 may determine a luminance variable region LVR of the display panel 100 based on the gaze point GP, may decrease a luminance of the luminance variable region LVR, and may further decrease the luminance of the luminance variable region LVR as a distance between the luminance variable region LVR and the gaze point GP increases.

For example, the timing controller 200 may determine a region in which a distance from the gaze point GP is greater than or equal to a first reference distance RD1 as the luminance variable region LVR. That is, the luminance variable region LVR may be a region in which a distance from the gaze point GP is greater than or equal to a preset distance.

The timing controller 200 may determine a luminance fixed region LFR of the display panel 100 based on the gaze point GP. The luminance fixed region LFR may be closer to the gaze point GP than the luminance variable region LVR.

For example, the timing controller 200 may determine a region in the display panel 100 in which the distance from the gaze point GP is smaller than the first reference distance RD1 as the luminance fixed region LFR. That is, the luminance fixed region LFR may be a region in which the distance from the gaze point GP is smaller than a preset distance.

The timing controller 200 may decrease the luminance of the luminance variable region LVR, and may further decrease the luminance of the luminance variable region LVR as the distance between the luminance variable region LVR and the gaze point GP increases. The luminance ratio of the luminance fixed region LFR may be constant regardless of the distance from the gaze point GP. As used herein, a luminance ratio of a certain point (e.g., point in the luminance fixed region LFR) is defined as a ratio of a current luminance of the certain point to a reference luminance. In an embodiment, the luminance ratio of the luminance fixed region LFR may be a maximum luminance ratio of the luminance variable region LVR.

For example, the luminance ratio of the luminance variable region LVR may decrease from 100% as the distance from the gaze point GP increases. The luminance ratio of the luminance fixed region LFR may be 100%, which is the maximum luminance ratio of the luminance variable region LVR. In this case, the luminance of the luminance fixed region LFR is the reference luminance.

Accordingly, since the luminance ratio of the gaze point GP is relatively high, visibility may be effectively improved. In addition, since the luminance ratio decreases as the distance from the gaze point GP increases, power consumption may be effectively reduced.

Figure 5:
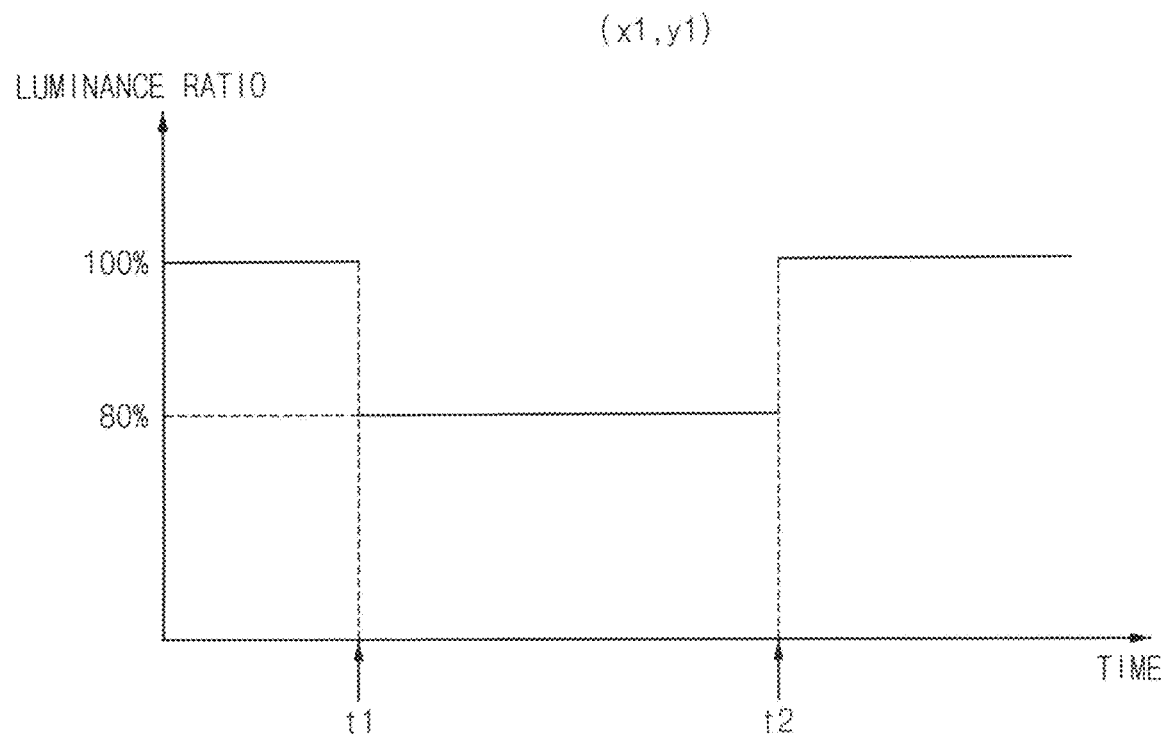
FIG. 5 is a graph illustrating an example in which the display device of FIG. 1 adjusts a luminance when a gaze point is changed.

FIG. 5 is a graph illustrating an example in which the display device of FIG. 1 adjusts a luminance as the gaze point GP is changed, and FIG. 5 illustrates the luminance ratio of arbitrary (x1, y1) coordinate of the display panel 100 versus time. FIG. 5 illustrates a case that the timing controller 200 restores the luminance of the arbitrary (x1, y1) coordinate decreased by a previous change of the gaze point (i.e., a gaze point GP before the gaze point GP is changed)

and the location of the gaze point GP is restored. The luminance of the arbitrary (x1, y1) coordinate decreased by the previous gaze point may be the decreased luminance of a region of the arbitrary (x1, y1) coordinate determined as the luminance variable region LVR by the previous gaze point before the gaze point GP is changed. Here, the luminance ratio of the arbitrary (x1, y1) coordinate may be a ratio of a current luminance of the arbitrary (x1, y1) coordinate to a reference luminance. For example, when the luminance ratio of a specific region is 80%, the luminance of the specific region may be decreased by 20% with respect to the reference luminance. That is, when the timing controller 200 decreases the luminance of the specific region by 20% with respect to the reference luminance, the luminance ratio of the specific region may be 80%. For example, assuming that the (x1, y1) coordinate is included in the luminance fixed region LFR before the first time point t1, the luminance ratio of the (x1, y1) coordinate before the first time point t1 may be 100%.

For example, assuming that (x1, y1) coordinate is included in the luminance variable region LVR as the gaze point GP is changed at the first time point t1, the luminance ratio of the (x1, y1) coordinate may be decreased to 80% after the first time point t1.

For example, assuming that (x1, y1) coordinate is included in the luminance fixed region LFR as the gaze point GP is changed at the second time point t2, the luminance ratio of the (x1, y1) coordinate may be restored to 100% after the second time point t2.

Figure 6:
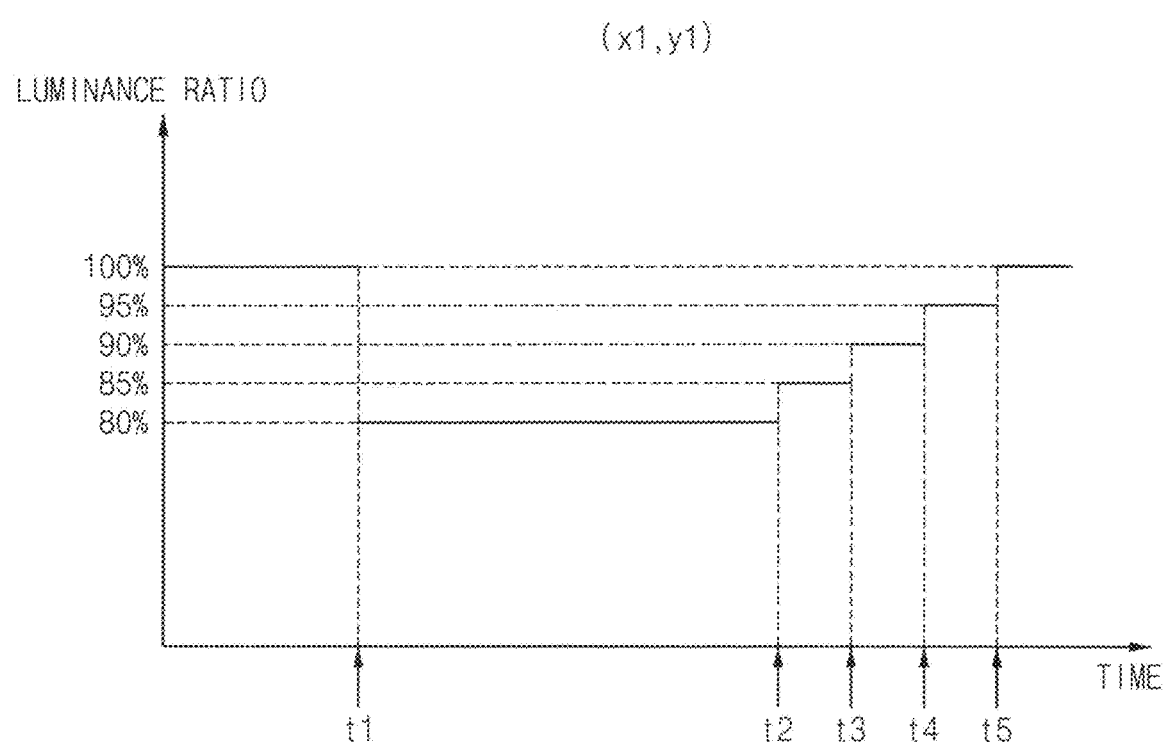
FIG. 6 is a graph illustrating an example in which a display device according to embodiments of the present invention adjusts a luminance when a gaze point is changed.

FIG. 6 is a graph illustrating an example in which a display device according to embodiments of the present invention adjusts the luminance when the gaze point GP is changed. FIG. 6 illustrates the luminance ratio of arbitrary (x1, y1) coordinate of the display panel 100.

The display device according to the present embodiment is substantially the same as the display device of FIG. 1 except for gradually restoring the luminance. Thus, the same reference numerals are used to refer to the same or similar element, and any repetitive explanation will be omitted.

Referring to FIGS. 1, 3, and 6, when the gaze point GP is changed, the timing controller 200 may gradually restore the luminance of the (x1, y1) coordinate in the luminance variable region LVR decreased by the previous change of the gaze point.

For example, assuming that the (x1, y1) coordinate is included in the luminance fixed region LFR before the first time point t1, the luminance ratio of the (x1, y1) coordinate before the first time point t1 may be 100%.

For example, assuming that (x1, y1) coordinate is included in the luminance variable region LVR as the gaze point GP is changed at the first time point t1, the luminance ratio of the (x1, y1) coordinate may be decreased to 80% after the first time point t1.

For example, assuming that (x1, y1) coordinate is included in the luminance fixed region LFR as the gaze point GP is changed at the second time point t2, the timing controller 200 may restore the luminance ratio of the (x1, y1) coordinate to 85%.

For example, assuming that the gaze point GP is maintained and the (x1, y1) coordinate is included in the luminance fixed region LFR at a third time point t3, the timing controller 200 may restore the luminance ratio of the (x1, y1) coordinate to 90%.

For example, assuming that the gaze point GP is maintained and the (x1, y1) coordinate is included in the luminance fixed region LFR at a fourth time point t4, the timing controller 200 may restore the luminance ratio of the (x1, y1) coordinate to 95%.

For example, assuming that the gaze point GP is maintained and the (x1, y1) coordinate is included in the luminance fixed region LFR at a fifth time point t5, the timing controller 200 may completely restore the luminance ratio of the (x1, y1) coordinate to 100%.

In this way, the display device may prevent a sudden change in luminance and prevent flicker caused by the sudden change in luminance by gradually restoring the decreased luminance.

Figure 7:
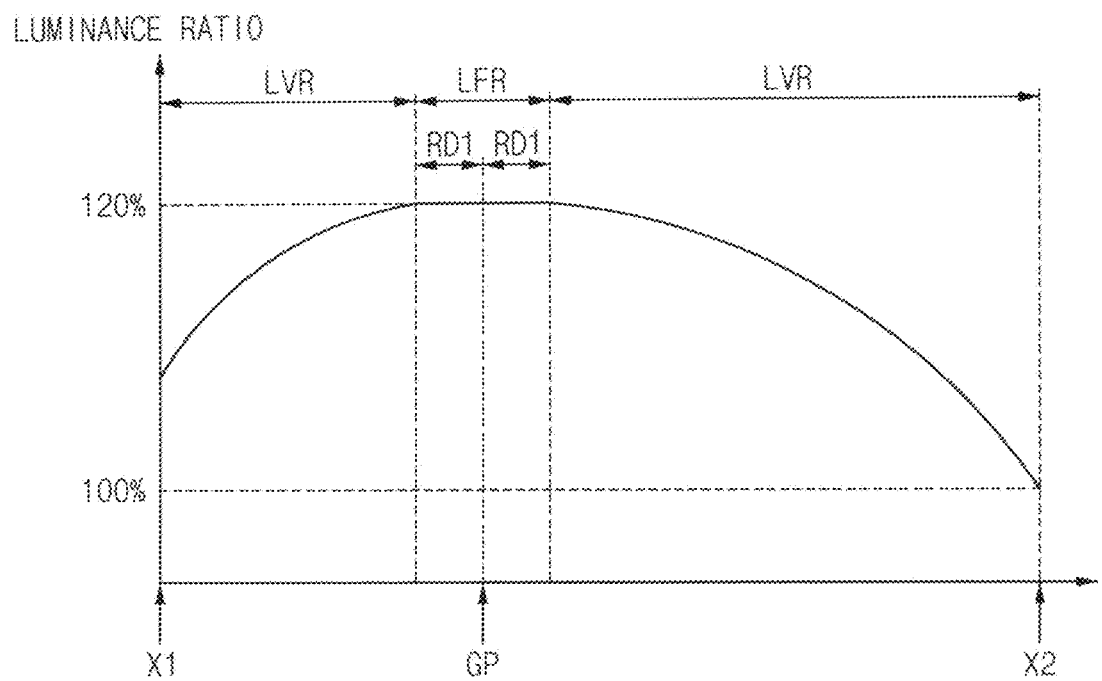
FIG. 7 is a graph illustrating an example in which a display device according to embodiments of the present invention adjusts a luminance in a measurement line.

FIG. 7 is a graph illustrating an example in which a display device according to embodiments of the present invention adjusts the luminance in the measurement line ML. FIG. 7 shows the luminance ratio measured along the measurement line ML of FIG. 3 for convenience of explanation.

The display device according to the present embodiment is substantially the same as the display device of FIG. 1 except for increasing the luminance. Thus, the same reference numerals are used to refer to the same or similar element, and any repetitive explanation will be omitted.

FIGS. 1, 3, and 7, the timing controller 200 may increase the luminance of the luminance variable region LVR, may further increase the luminance of the luminance variable region LVR as the distance between the luminance variable region LVR and the gaze point GP decreases. The timing controller 200 may increase the luminance of the luminance fixed region LFR. The luminance ratio of the luminance fixed region LFR may be constant regardless of the distance from the gaze point GP. In an embodiment, the luminance ratio of the luminance fixed region LFR may be equal to the maximum luminance ratio of the luminance variable region LVR.

For example, the luminance ratio of the luminance variable region LVR may increase from 100% as the distance from the gaze point GP decreases. The luminance ratio of the luminance fixed region LFR may be 120%, which is the maximum luminance ratio of the luminance variable region LVR.

Accordingly, since the luminance ratio at the gaze point GP is relatively high, visibility may be effectively improved.

Figure 8:
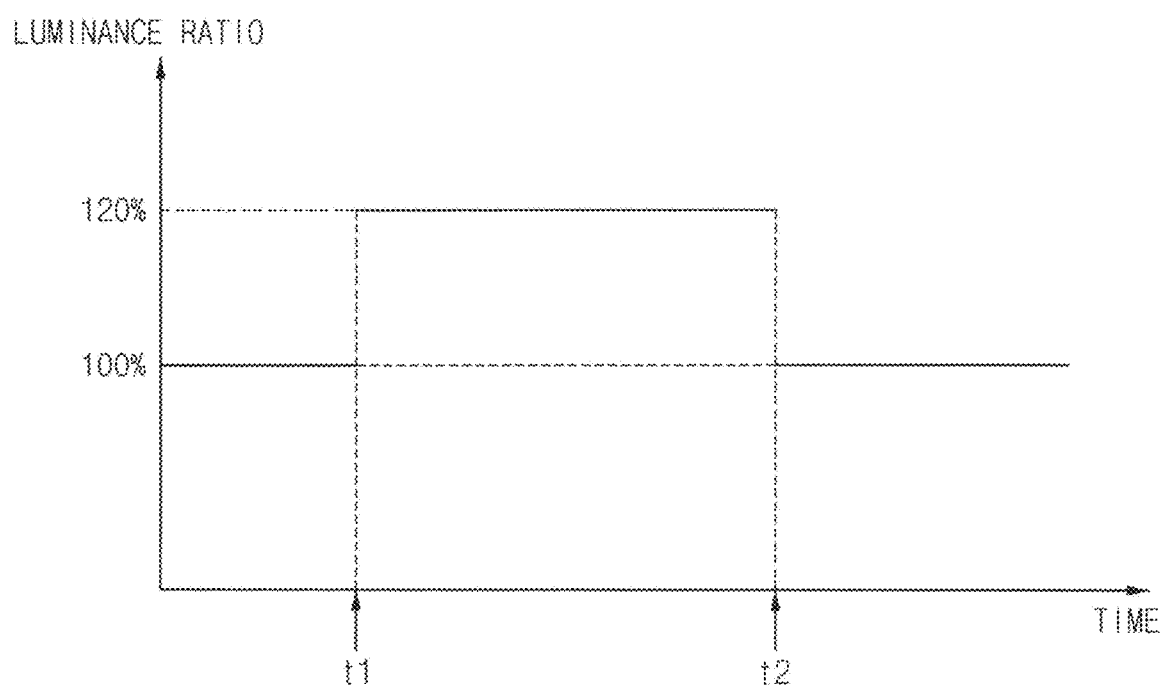
FIG. 8 is a graph illustrating an example in which the display device of FIG. 7 adjusts a luminance when a gaze point is changed.

FIG. 8 is a graph illustrating an example in which the display device of FIG. 7 adjusts a luminance when the gaze point GP is changed. FIG. 8 illustrates the luminance ratio of arbitrary (x1, y1) coordinate of the display panel 100.

Referring to FIGS. 1, 3, and 8, the timing controller 200 may gradually restore the luminance of the (x1, y1) coordinate in the luminance variable region LVR increased by the previous change of the gaze point when the gaze point GP is changed again. The luminance of the luminance variable region LVR increased by the previous gaze point may be the increased luminance of a region determined as the luminance variable region LVR by the gaze point GP before the gaze point GP is changed.

For example, assuming that the (x1, y1) coordinate is included in the luminance fixed region LFR before the first time point t1, the luminance ratio of the (x1, y1) coordinate before the first time point t1 may be 100%.

For example, assuming that (x1, y1) coordinate is included in the luminance variable region LVR as the gaze point GP is changed at the first time point t1, the luminance ratio of the (x1, y1) coordinate may be increased to 120% after the first time point t1.

For example, assuming that (x1, y1) coordinate is included in the luminance fixed region LFR as the gaze point GP is changed at the second time point t2, the luminance ratio of the (x1, y1) coordinate may be restored to 100% after the second time point t2.

Figure 9:
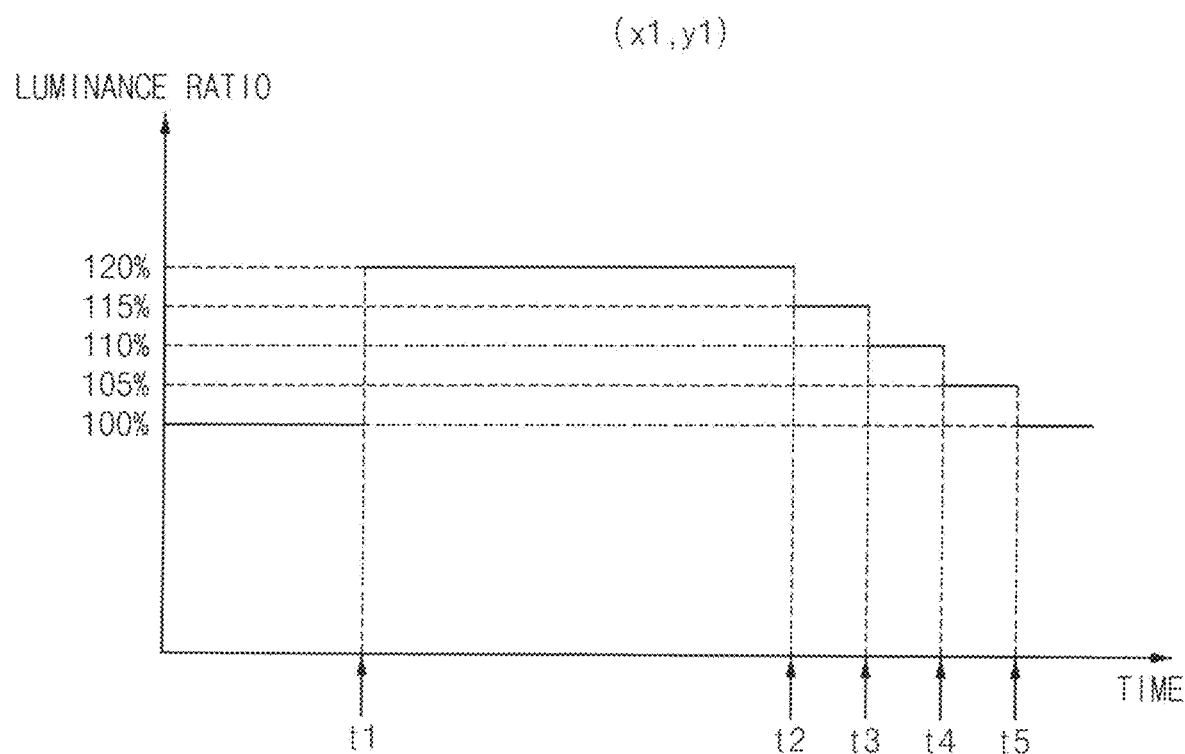
FIG. 9 is a graph illustrating an example in which a display device according to embodiments of the present invention adjusts a luminance when a gaze point is changed.

FIG. 9 is a graph illustrating an example in which a display device according to embodiments of the present invention adjusts the luminance when the gaze point GP is changed. FIG. 9 illustrates the luminance ratio of arbitrary (x1, y1) coordinate of the display panel 100.

The display device according to the present embodiment is substantially the same as the display device of FIG. 1 except for gradually restoring the luminance. Thus, the same reference numerals are used to refer to the same or similar element, and any repetitive explanation will be omitted.

Referring to FIGS. 1, 3, and 9, when the gaze point GP is changed, the timing controller 200 may gradually restore the luminance of the (x1, y1) coordinate in the luminance variable region LVR increased by the previous location change of the gaze point.

For example, assuming that the (x1, y1) coordinate is included in the luminance fixed region LFR before the first time point t1, the luminance ratio of the (x1, y1) coordinate before the first time point t1 may be 100%.

For example, assuming that (x1, y1) coordinate is included in the luminance variable region LVR as the gaze point GP is changed at the first time point t1, the luminance ratio of the (x1, y1) coordinate may be increased to 120% after the first time point t1.

For example, assuming that (x1, y1) coordinate is included in the luminance fixed region LFR as the gaze point GP is changed at the second time point t2, the timing controller 200 may restore the luminance ratio of the (x1, y1) coordinate to 115%.

For example, assuming that the gaze point GP is maintained and the (x1, y1) coordinate is included in the luminance fixed region LFR at a third time point t3, the timing controller 200 may restore the luminance ratio of the (x1, y1) coordinate to 110%.

For example, assuming that the gaze point GP is maintained and the (x1, y1) coordinate is included in the luminance fixed region LFR at a fourth time point t4, the timing controller 200 may restore the luminance ratio of the (x1, y1) coordinate to 105%.

For example, assuming that the gaze point GP is maintained and the (x1, y1) coordinate is included in the luminance fixed region LFR at a fifth time point t5, the timing controller 200 may completely restore the luminance ratio of the (x1, y1) coordinate to 100%.

In this way, the display device may prevent a sudden change in luminance and prevent flicker caused by the sudden change in luminance by gradually restoring the increased luminance.

Figure 10:
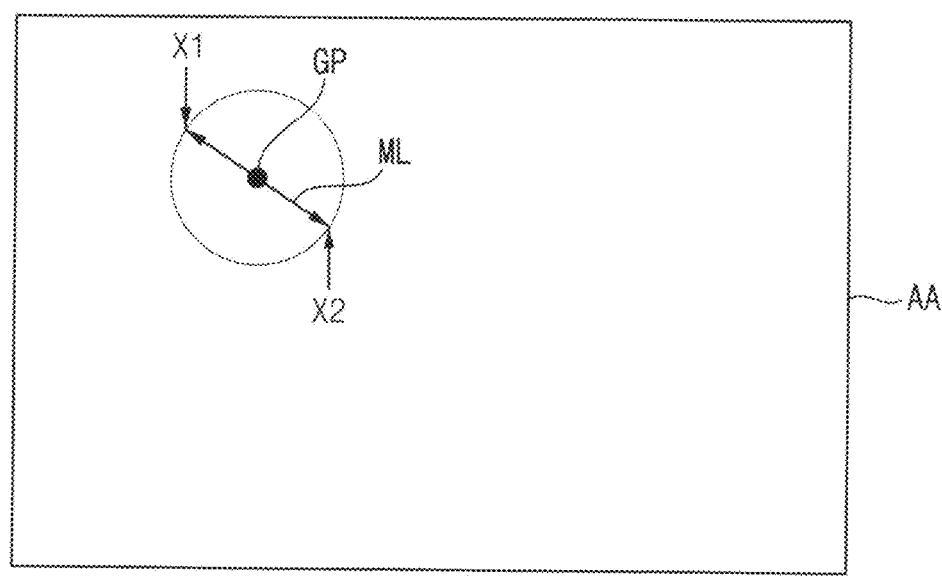
FIG. 10 is a diagram illustrating an example of a gaze point on a display device according to embodiments of the present invention.
Figure 11:
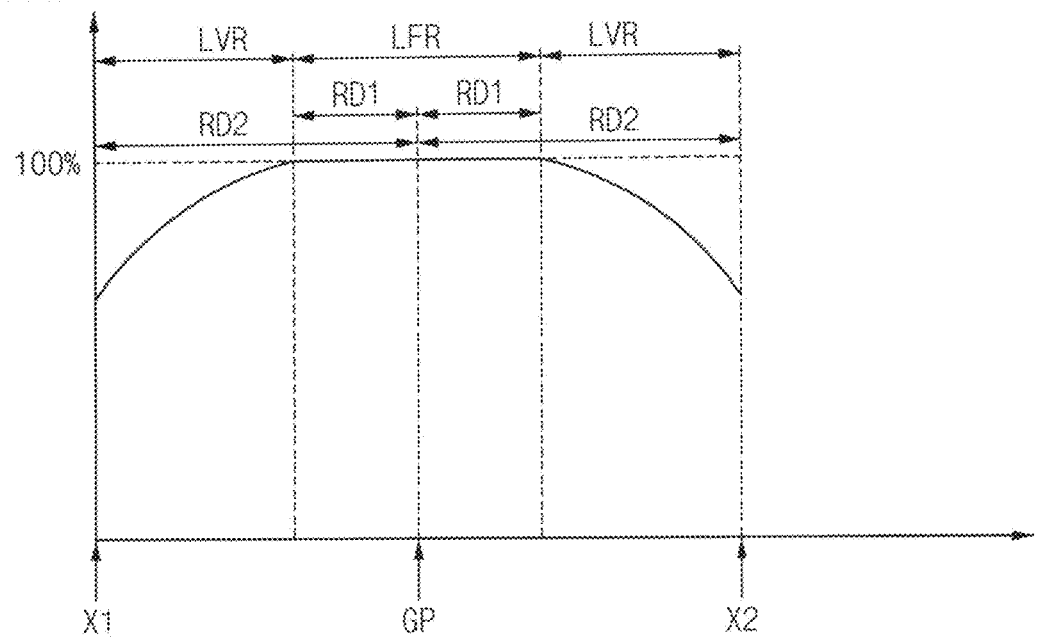
FIG. 11 is a graph illustrating an example in which the display device of FIG. 10 adjusts a luminance in a measurement line.

FIG. 10 is a diagram illustrating an example of the gaze point GP on a display device according to embodiments of the present invention, and FIG. 11 is a graph illustrating an example in which the display device of FIG. 10 adjusts the luminance in the measurement line ML. FIG. 11 shows a luminance ratio measured along the measurement line ML of FIG. for convenience of explanation.

The display device according to the present embodiment is substantially the same as the display device of FIG. 1 except for the luminance variable region LVR. Thus, the same reference numerals are used to refer to the same or similar element, and any repetitive explanation will be omitted.

FIGS. 1, 10, and 11, the timing controller 200 may determine the luminance variable region LVR of the display panel 100 based on the gaze point GP. For example, the timing controller 200 may determine a region in which the distance from the gaze point GP is greater than or equal to a first reference distance RD1 and smaller than a second reference distance RD2 greater than the first reference distance RD1 as the luminance variable region LVR. That is, the luminance variable region LVR may be a region in which a distance from the gaze point GP is within a preset range compared to the embodiment in FIG. 3, in which all area of the display panel 100 outside the luminance fixed region LFR is the luminance variable region LVR.

The timing controller 200 may determine the luminance fixed region LFR based on the gaze point GP. The luminance fixed region LFR may be closer to the gaze point GP than the luminance variable region LVR.

For example, the timing controller 200 may determine a region in which the distance from the gaze point GP is smaller than the first reference distance RD1 as the luminance fixed region LFR. That is, the luminance fixed region LFR may be a region in which the distance from the gaze point GP is smaller than a preset distance.

The timing controller 200 may decrease the luminance of the luminance variable region LVR, and may further decrease the luminance of the luminance variable region LVR as the distance between the luminance variable region LVR and the gaze point GP increases. The luminance ratio of the luminance fixed region LFR may be constant regardless of the distance from the gaze point GP. In an embodiment, the luminance ratio of the luminance fixed region LFR may be equal to the maximum luminance ratio of the luminance variable region LVR.

For example, the luminance ratio of the luminance variable region LVR may decrease from 100% as the distance from the gaze point GP increases. The luminance ratio of the luminance fixed region LFR may be 100%, which is the maximum luminance ratio of the luminance variable region LVR.

Accordingly, since the luminance ratio at the gaze point GP is relatively high, visibility may be effectively improved. In addition, since the luminance ratio decreases as the distance from the gaze point GP increases, power consumption may be effectively reduced.

Figure 12:
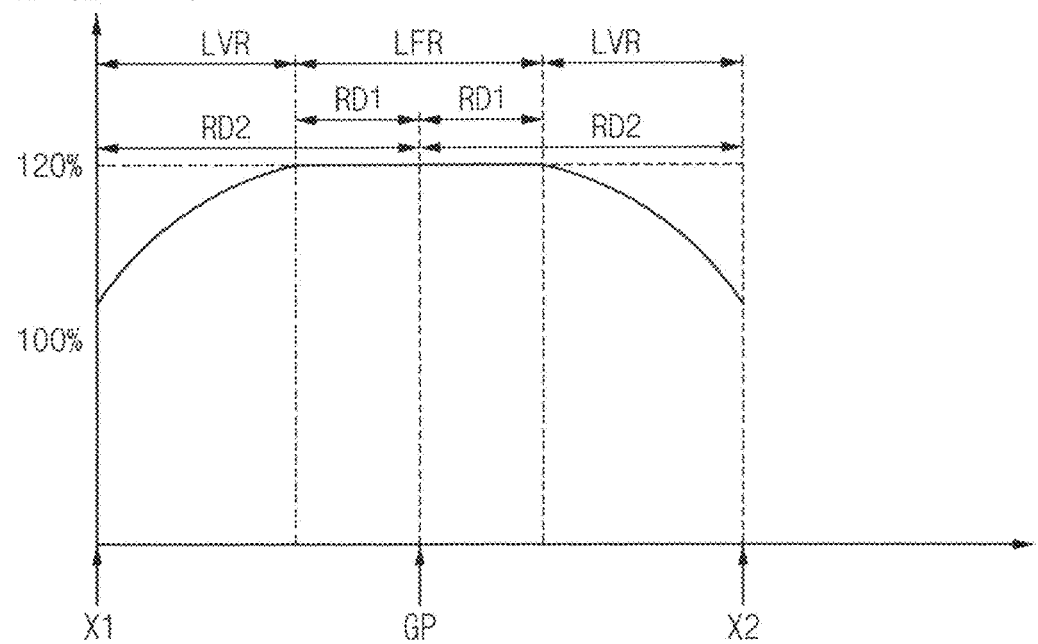
FIG. 12 is a graph illustrating an example in which a display device according to embodiments of the present invention adjusts a luminance in a measurement line.

FIG. 12 is a graph illustrating an example in which a display device according to embodiments of the present invention adjusts the luminance in the measurement line ML.

The display device according to the present embodiment is substantially the same as the display device of FIG. 10 except for increasing the luminance. Thus, the same reference numerals are used to refer to the same or similar element, and any repetitive explanation will be omitted.

FIGS. 1, 10, and 12, the timing controller 200 may increase the luminance of the luminance variable region LVR, may further increase the luminance of the luminance variable region LVR as the distance between the luminance variable region LVR and the gaze point GP decreases. The timing controller 200 may increase the luminance of the luminance fixed region LFR. The luminance ratio of the luminance fixed region LFR may be constant regardless of the distance from the gaze point GP. In an embodiment, the luminance ratio of the luminance fixed region LFR may be equal to the maximum luminance ratio of the luminance variable region LVR.

For example, the luminance ratio of the luminance variable region LVR may increase from 100% as the distance from the gaze point GP increases. The luminance ratio of the luminance fixed region LFR may be 120%, which is the maximum luminance ratio of the luminance variable region LVR.

Accordingly, since the luminance ratio of the gaze point GP is relatively high, visibility may be improved.

Figure 13:
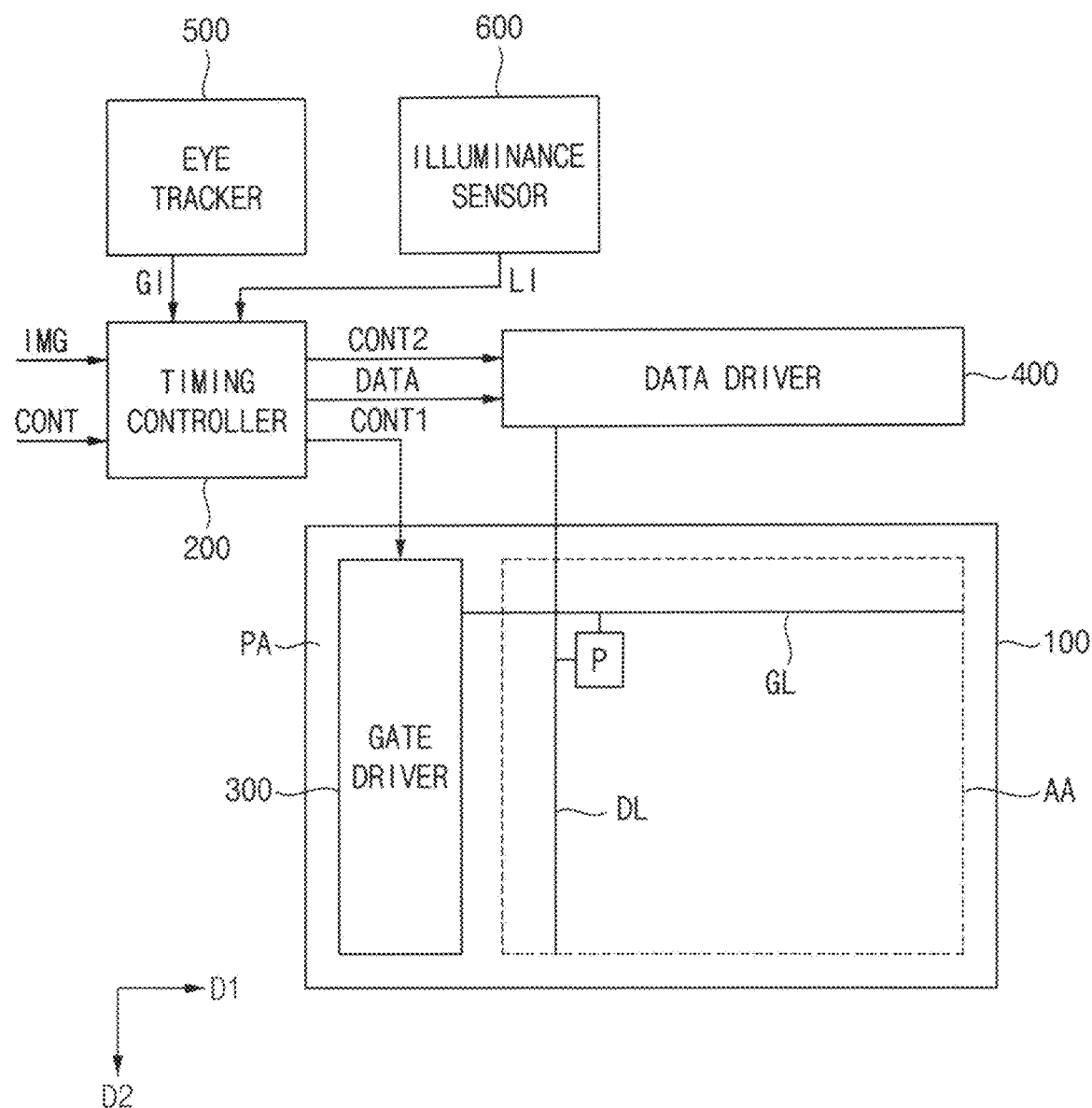
FIG. 13 is a block diagram illustrating a display device according to embodiments of the present invention.
Figure 14:
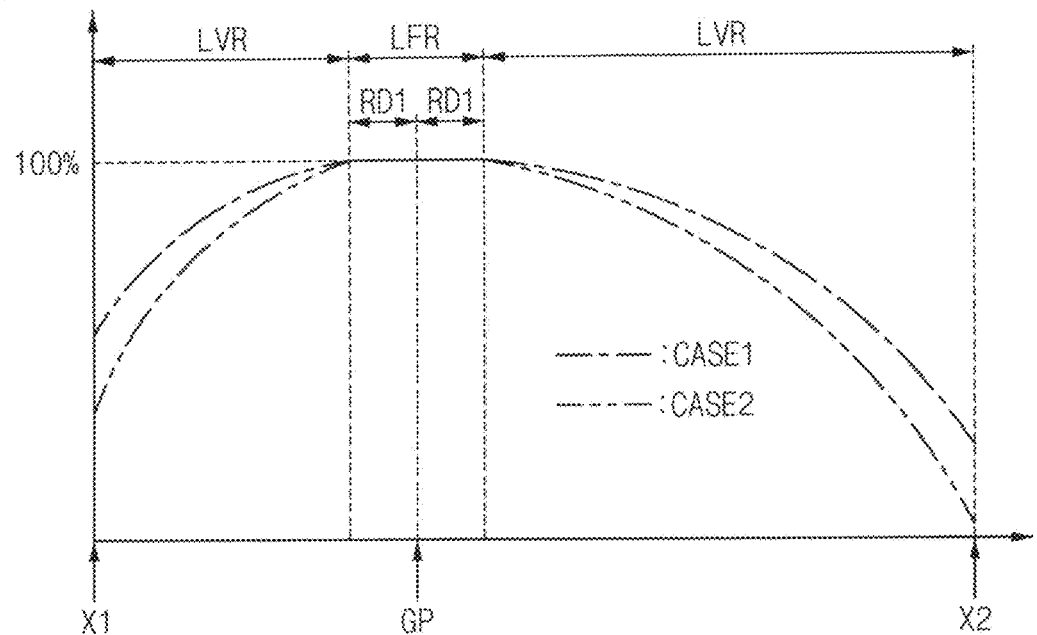
FIG. 14 is a graph illustrating an example in which the display device of FIG. 13 adjusts a luminance in a measurement line.

FIG. 13 is a block diagram illustrating a display device according to embodiments of the present invention, and FIG. 14 is a graph illustrating an example in which the display device of FIG. 13 adjusts the luminance in the measurement line ML. FIG. 14 shows the luminance ratio measured along the measurement line ML of FIG. 3 for convenience of explanation.

The display device according to the present embodiment is substantially the same as the display device of FIG. 1 except for adjusting the luminance according to an illuminance. Thus, the same reference numerals are used to refer to the same or similar element, and any repetitive explanation will be omitted.

Referring to FIGS. 13 and 14, the display device may further include an illuminance sensor 600 sensing illuminance. The illuminance sensor 600 may sense the illuminance (environmental illuminance) around the display device and output information LI on the illuminance around the display device to the timing controller 200.

The timing controller 200 may decrease the luminance of the luminance variable region LVR less as the sensed illuminance is higher. For example, assuming that the sensed illuminance of CASE 1 is higher than sensed illuminance of CASE 2, the luminance ratio of CASE 1 in the luminance variable region LVR may be greater than the luminance ratio of CASE 2 in the luminance variable region LVR.

Accordingly, the display device may improve visibility by decreasing the luminance of the luminance variable region LVR less at a high illuminance level.

Figure 15:
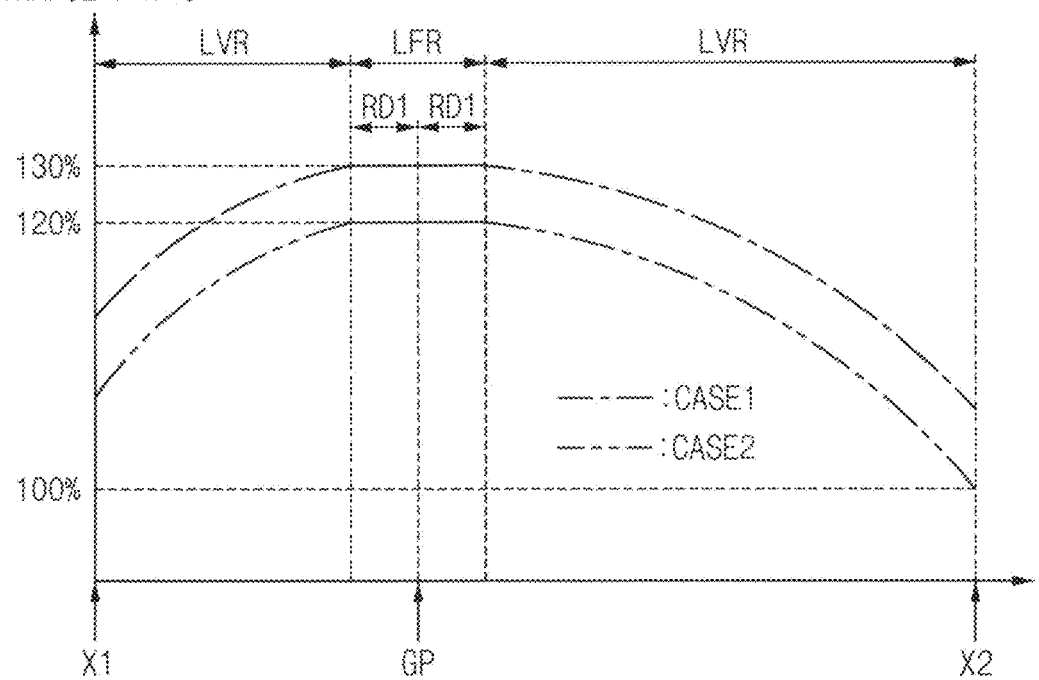
FIG. 15 is a graph illustrating an example in which a display device according to embodiments of the present invention adjusts a luminance in a measurement line.

FIG. 15 is a graph illustrating an example in which a display device according to embodiments of the present invention adjusts the luminance in the measurement line ML. FIG. 15 shows the luminance ratio measured along the measurement line ML of FIG. 3 for convenience of explanation.

The display device according to the present embodiment is substantially the same as the display device of FIG. 7 except for adjusting the luminance according to an illuminance. Thus, the same reference numerals are used to refer to the same or similar element, and any repetitive explanation will be omitted.

Referring to FIG. 15, the display device may further include the illuminance sensor sensing environmental illuminance. The illuminance sensor may sense the illuminance around the display device and output the information on the illuminance to the timing controller 200.

The timing controller 200 may increase the luminance of the luminance variable region LVR more as the sensed illuminance is higher. For example, assuming that the illuminance of CASE 1 is higher than that of CASE 2, the luminance ratio of CASE 1 in the luminance variable region LVR may be greater than the luminance ratio of CASE 2 in the luminance variable region LVR.

Accordingly, the display device may improve visibility by further increasing the luminance of the luminance variable region LVR at a high illuminance level.

Figure 16:
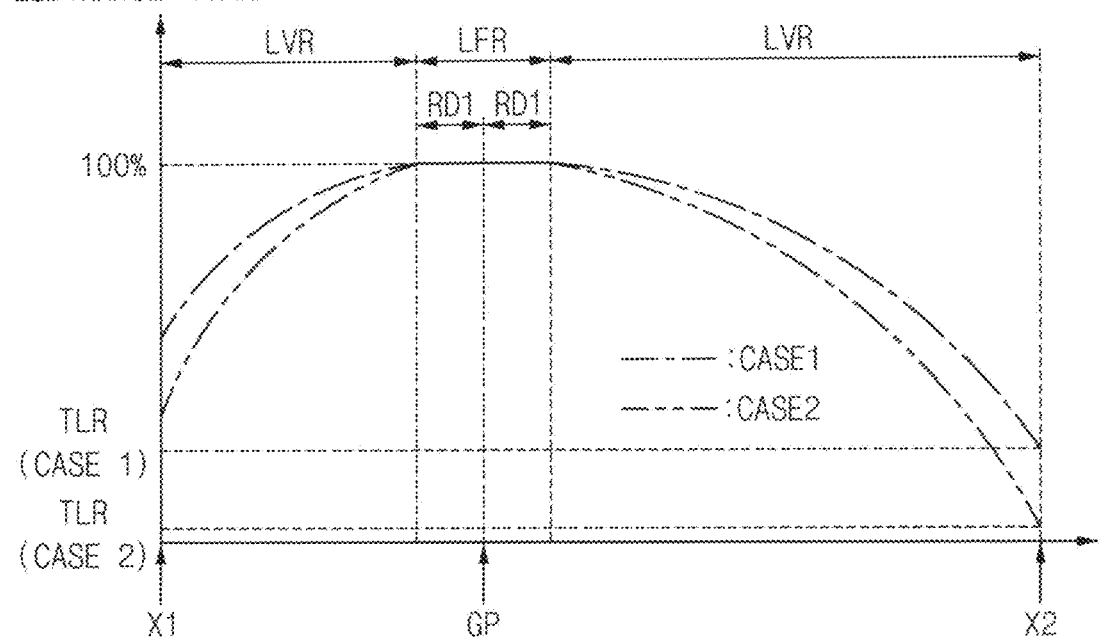
FIG. 16 is a graph illustrating an example in which a display device adjusts a luminance in a measurement line according to embodiments of the present invention.

FIG. 16 is a graph illustrating an example in which a display device adjusts the luminance in the measurement line ML according to embodiments of the present invention. FIG. 16 shows the luminance ratio measured along the measurement line ML of FIG. 3 for convenience of explanation.

The display device according to the present embodiment is substantially the same as the display device of FIG. 1 except for varying the luminance according to a target luminance ratio TLR set by the user. Thus, the same reference numerals are used to refer to the same or similar element, and any repetitive explanation will be omitted.

Referring to FIGS. 1, 3, and 16, the timing controller 200 may decrease the luminance of the luminance variable region LVR more as the target luminance ratio TLR set by the user decreases (i.e., is lower). The timing controller 200 may decrease the luminance ratio of the farthest end point in the luminance variable region LVR to the target luminance ratio TLR. In this case, the target luminance ratio TLR is a minimum luminance ratio of the luminance variable region LVR, and the farthest end point is the farthest end point in the luminance variable region LVR from the gaze point GP.

The target luminance ratio TLR may be set by the user. For example, when the user desires to view a brighter image, the user may increase the target luminance ratio TLR. For example, when the user desires to view a darker image, the user may decrease the target luminance ratio TLR.

For example, assuming that the target luminance ratio TLR of CASE 2 is smaller than that of CASE 1, the luminance ratio of CASE 2 in the luminance variable region LVR may be smaller than the luminance ratio of CASE 1 in the luminance variable region LVR.

Figure 17:
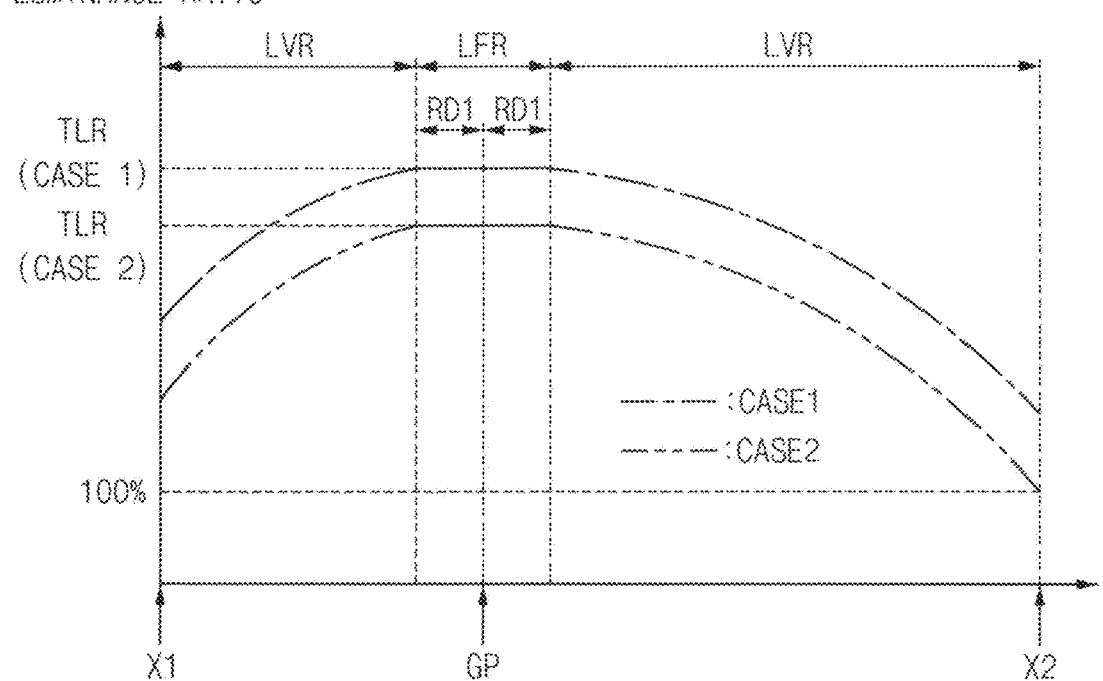
FIG. 17 is a graph illustrating an example in which a display device adjusts a luminance in a measurement line according to embodiments of the present invention.

FIG. 17 is a graph illustrating an example in which a display device adjusts the luminance in the measurement line ML according to embodiments of the present invention. FIG. 17 shows the luminance ratio measured along the measurement line ML of FIG. 3 for convenience of explanation.

The display device according to the present embodiment is substantially the same as the display device of FIG. 7 except for varying the luminance according to a target luminance ratio TLR set by the user. Thus, the same reference numerals are used to refer to the same or similar element, and any repetitive explanation will be omitted.

Referring to FIGS. 1, 3, and 17, the timing controller 200 may further increase the luminance of the luminance variable region LVR as the target luminance ratio TLR set by the user increases. The timing controller 200 may increase the luminance ratio of the nearest end point in the luminance variable region LVR to the target luminance ratio TLR. In this case, the target luminance ratio TLR is a maximum luminance ratio of the luminance variable region LVR, and the nearest end point is the end point in the luminance variable region LVR adjacent to the gaze point GP.

The target luminance ratio TLR may be a value set by the user. For example, when the user desires to view a brighter image, the user may increase the target luminance ratio TLR. For example, when the user desires to view a darker image, the user may decrease the target luminance ratio TLR.

For example, assuming that the target luminance ratio TLR of CASE 1 is greater than that of CASE 2, the luminance ratio of CASE 1 in the luminance variable region LVR may be greater than the luminance ratio of CASE 2 in the luminance variable region LVR.

Figure 18:
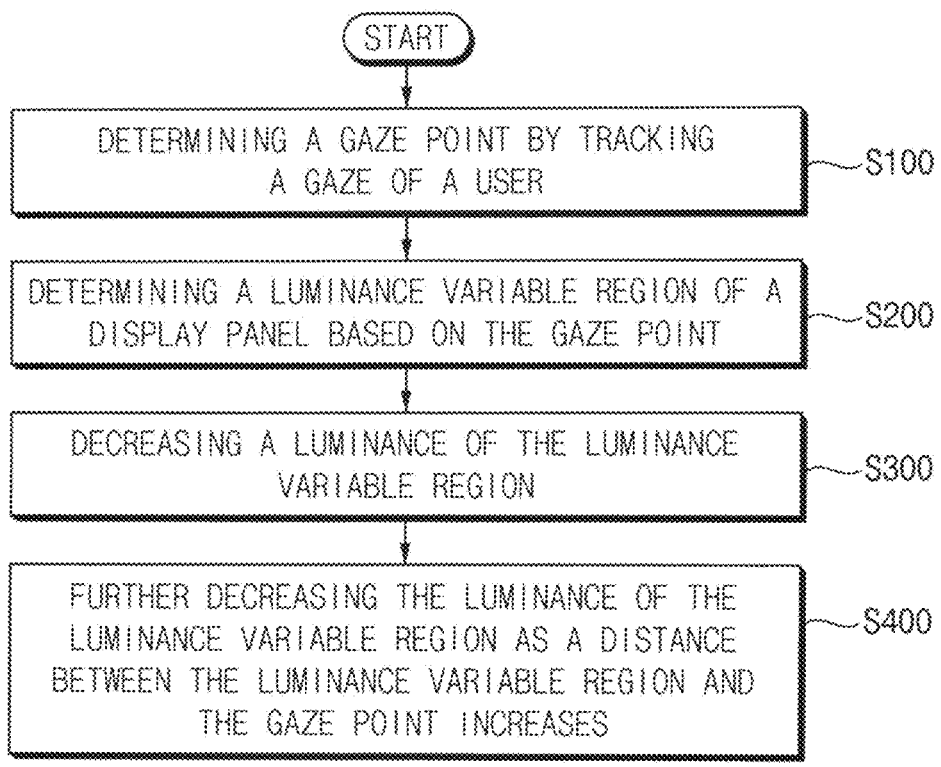
FIG. 18 is a flowchart illustrating a method of driving a display device according to embodiments of the present invention.

FIG. 18 is a flowchart illustrating a method of driving a display device according to embodiments of the present invention.

Referring to FIG. 18, the method of FIG. 18 may determine the gaze point by tracking the gaze of the user (S100), determine the luminance variable region of the display panel based on the gaze point (S200), decrease the luminance of the luminance variable region (S300), and further decrease the luminance of the luminance variable region as the distance between the luminance variable region and the gaze point increases (S400).

Specifically, the method of FIG. 18 may determine the luminance variable region of the display panel based on the gaze point (S200). In an embodiment, the luminance variable region may be a region in which the distance from the gaze point is greater than or equal to the first reference distance. In an embodiment, the luminance variable region may be a region in which the distance from the gaze point is greater than or equal to the first reference distance and smaller than the second reference distance greater than the first reference distance.

The method of FIG. 18 may restore the luminance of the luminance variable region decreased by the previous change of the gaze point when the gaze point is changed. In an embodiment, the method of FIG. 18 may gradually restore the luminance of the luminance variable region decreased by the previous change of the gaze point when the gaze point is restored.

In an embodiment, the method of FIG. 18 may sense the illuminance, and may less decrease the luminance of the luminance variable region as the illuminance increases. Accordingly, the method of FIG. 18 may improve visibility by varying the luminance according to the illuminance.

Figure 19:
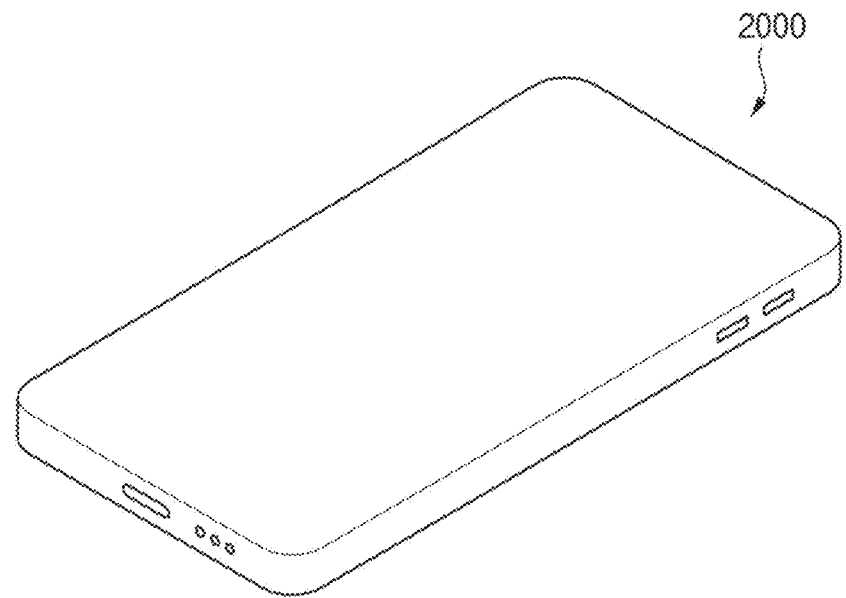
FIG. 19 is a block diagram showing an electronic device according to embodiments of the present invention.
Figure 20:
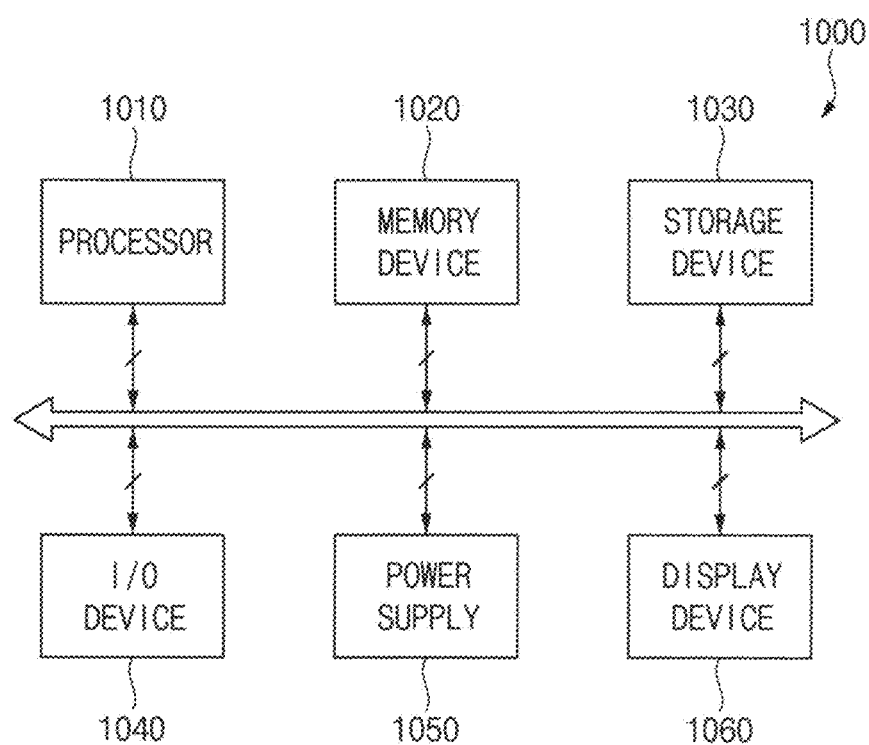
FIG. 20 is a diagram showing an example in which the electronic device of FIG. 19 is implemented as a smart phone.

FIG. 19 is a block diagram showing an electronic device according to embodiments of the present invention, and FIG. 20 is a diagram showing an example in which the electronic device of FIG. 19 is implemented as a smart phone.

Referring to FIGS. 19 and 20, the electronic device 1000 may include a processor 1010, a memory device 1020, a storage device 1030, an input/output ("I/O") device 1040, a power supply 1050, and a display device 1060. Here, the display device 1060 may be the display device of FIG. 1. In addition, the electronic device 1000 may further include a plurality of ports for communicating with a video card, a sound card, a memory card, a universal serial bus ("USB") device, other electronic devices, etc. In an embodiment, as shown in FIG. 20, the electronic device 1000 may be implemented as a smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display ("HMD") device, etc.

The processor 1010 may perform various computing functions. The processor 1010 may be a microprocessor, a central processing unit ("CPU"), an application processor ("AP"), etc. The processor 1010 may be coupled to other components via an address bus, a control bus, a data bus, etc. Further, the processor 1010 may be coupled to an extended bus such as a peripheral component interconnection ("PCI") bus.

The memory device 1020 may store data for operations of the electronic device 1000. For example, the memory device 1020 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or at least one volatile memory device such as a dynamic random access memory ("DRAM") device, a static random access memory ("SRAM") device, a mobile DRAM device, etc.

The storage device 1030 may include a solid state drive ("SSD") device, a hard disk drive ("HDD") device, a CD-ROM device, etc.

The I/O device 1040 may include an input device such as a keyboard, a keypad, a mouse device, a touch pad, a touch screen, etc., and an output device such as a printer, a speaker, etc. In some embodiments, the I/O device 1040 may include the display device 1060.

The power supply 1050 may provide power for operations of the electronic device 1000. For example, the power supply 1050 may be a power management integrated circuit ("PMIC").

The display device 1060 may display an image corresponding to visual information of the electronic device 1000. For example, the display device 1060 may be an organic light emitting display device or a quantum dot light emitting display device, but is not limited thereto. The display device 1060 may be coupled to other components via the buses or other communication links. Here, the display device 1060 may improve visibility by varying the luminance according to the gaze point.

The inventions may be applied to any electronic device including the display device. For example, the inventions may be applied to a television ("TV"), a digital TV, a 3D TV, a mobile phone, a smart phone, a tablet computer, a virtual reality ("VR") device, a wearable electronic device, a personal computer ("PC"), a home appliance, a laptop computer, a personal digital assistant ("PDA"), a portable multimedia player ("PMP"), a digital camera, a music player, a portable game console, a navigation device, etc.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims. The present invention is defined by the following claims, with equivalents of the claims to be included therein.

What is claimed is:

1. A display device comprising:
   a display panel including pixels;
   an eye tracker configured to determine a gaze point on the display panel by tracking a gaze of a user; and
   a timing controller configured to determine a luminance variable region of the display panel and a luminance fixed region of the display panel based on the gaze point, and to decrease a luminance of the luminance variable region, wherein the timing controller is configured to decrease the luminance of a point in the luminance variable region more as the point in the luminance variable region is farther from the gaze point; and wherein a luminance ratio of the luminance fixed region is equal to a maximum luminance ratio of the luminance variable region.

2. The display device of claim 1, wherein the timing controller is configured to determine a region in which a distance from the gaze point is greater than or equal to a first reference distance as the luminance variable region.

3. The display device of claim 1, wherein the timing controller is configured to determine a region in which a distance from the gaze point is greater than or equal to a first reference distance and smaller than a second reference distance greater than the first reference distance as the luminance variable region.

4. The display device of claim 1, wherein the timing controller is configured to gradually restore the luminance of the point in the luminance variable region when the luminance is decreased by a previous change of the gaze point and the gaze point is restored.

5. The display device of claim 1, further comprising:
an illuminance sensor configured to sense an environmental illuminance,
wherein the timing controller is configured to decrease the luminance of the luminance variable region less as the sensed illuminance is higher.

6. The display device of claim 1, wherein the timing controller is configured to decrease the luminance of the luminance variable region more as a target luminance ratio set by the user is lower.

7. The display device of claim 1, wherein the timing controller is configured to gradually restore the luminance of the point in the luminance variable region when the luminance is increased by a previous change of the gaze point and the gaze point is changed.

8. The display device of claim 1, wherein the luminance fixed region is closer to the gaze point than the luminance variable region.

9. A display device comprising:
a display panel including pixels;
an eye tracker configured to determine a gaze point on the display panel by tracking a gaze of a user; and
a timing controller configured to determine a luminance variable region of the display panel and a luminance fixed region of the display panel based on the gaze point, and to increase a luminance of the luminance variable region, wherein the timing controller is configured to decrease the luminance of a point in the luminance variable region more as the point in the luminance variable region is farther from the gaze point; and wherein a luminance ratio of the luminance fixed region is equal to a maximum luminance ratio of the luminance variable region.

10. The display device of claim 9, wherein the timing controller is configured to determine a region in which a distance from the gaze point is greater than or equal to a first reference distance as the luminance variable region.

11. The display device of claim 9, wherein the timing controller is configured to determine a region in which a distance from the gaze point is greater than or equal to a first reference distance and smaller than a second reference distance greater than the first reference distance as the luminance variable region.

12. The display device of claim 9, further comprising:
an illuminance sensor configured to sense an environmental illuminance,
wherein the timing controller is configured to increase the luminance of the luminance variable region more as the sensed illuminance is higher.

13. The display device of claim 9, wherein the timing controller is configured to increase the luminance of the luminance variable region more as a target luminance ratio set by the user is higher.

14. A method of driving a display device comprising:
determining a gaze point on a display panel of the display device by tracking a gaze of a user;
determining a luminance variable region of the display panel and a luminance fixed region of the display panel based on the gaze point; and
decreasing a luminance of the luminance variable region, wherein the decreasing of the luminance includes decreasing the luminance of a point in the luminance variable region more as the point in the luminance variable region is farther from the gaze point; and wherein a luminance ratio of the luminance fixed region is equal to a maximum luminance ratio of the luminance variable region; and wherein the luminance variable region is farther from the gaze point than the luminance fixed region.

15. The method of claim 14, wherein the luminance variable region is a region in which a distance from the gaze point is greater than or equal to a first reference distance.

16. The method of claim 14, wherein the luminance variable region is a region in which a distance from the gaze point is greater than or equal to a first reference distance and smaller than a second reference distance greater than the first reference distance.

17. The method of claim 14, further comprising:
gradually restoring the luminance of the point in the luminance variable region when the luminance is decreased by a previous change of the gaze point and the gaze point is changed.

18. The method of claim 14, further comprising:
sensing an environmental illuminance; and
decreasing the luminance of the luminance variable region less as the sensed illuminance is higher.

* * * * *